UNITED STATES PATENT OFFICE.

CARL PAAL, OF ERLANGER, ASSIGNOR TO KALLE & CO., OF BIEBRICH, GERMANY.

PHENYLDIHYDROQUINAZOLINE.

SPECIFICATION forming part of Letters Patent No. 428,286, dated May 20, 1890.

Application filed October 2, 1889. Serial No. 325,801. (Specimens.)

*To all whom it may concern:*

Be it known that I, CARL PAAL, doctor of philosophy, residing at Erlanger, Germany, have invented new and useful Improvements in Medical Compounds; and I do hereby declare that the following is a full, clear, and exact description of the invention, which will enable others skilled in the art to which it appertains to make and use the same.

The subject of my invention is a new pharmaceutical product which may be termed "phenyldihydroquinazoline," by acting with reducing agents upon the formyl derivative of the orthonitrobenzyl aniline. The reaction takes place according to the following formula:

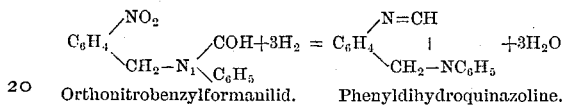

Orthonitrobenzylformanilid.   Phenyldihydroquinazoline.

In preparing the phenyldihydroquinazoline I prefer to proceed as follows: Ten parts of orthonitrobenzyl aniline—prepared, for example, in the manner previously described by Lellmann and Stickel, (Berl. Ber. XIX, 1604,)—are heated about two hours in a reflux-condenser with twenty parts of concentrated formic acid, and the orthonitrobenzylformanilid thus obtained is then precipitated by means of water. It crystallizes in yellowish needles, melting at 77° centigrade. The same body may be obtained by treating a benzine solution of ten parts of orthonitrobenzyl chloride with eight parts of sodium formanilide.

To reduce the orthonitrobenzylformanilid, all the well-known reducing agents may be employed.

If, for example, ten parts of orthonitrobenzylformanilid dissolved in thirty parts of alcohol are heated with fourteen parts of tin and twenty-eight parts of chlorhydric acid, a double salt of the chlorhydrate of phenyldihydroquinazoline with stannous chloride crystallizes on cooling. It melts at 130° to 134° centigrade, and has the formula: $C_{14}H_{12}N_2$·HClSnCl_2. By precipitating the tin by sulphureted hydrogen and evaporating the solution, I then obtain the chlorhydrate of phenyldihydroquinazoline in the form of white needles, melting at 80° centigrade. It contains two molecules of water of crystallization, which it loses at 100° centigrade. Its formula is: $C_{14}H_{12}N_2$HCl+2aq. In its anhydrous state it melts at 220° centigrade. This salt is very easily soluble in water and alcohol, and its aqueous solution is precipitated by means of common salt. On treating the aqueous solution with an alkali the base is obtained as an oil, which soon becomes solidified. It melts at 95° centigrade and is almost insoluble in water, but very easily soluble in alcohol and ether. The methyl derivative may be obtained in the same manner by substituting the orthonitrobenzylformop-toluid for the orthonitrobenzylformanilid. The base crystallizes in leafy white crystals, melting at 120° centigrade.

The phenyldiphydroquinazoline is employed in medicine as an excitant.

The dose may be from a quarter of a gram to one gram, and may be administered in the form of pills or wafers or in powder, or dissolved in water, wine, or other vehicle.

Having thus described the nature of my invention and the manner of performing the same, I would have it understood that what I claim as new, and desire to secure by Letters Patent, is—

The medical compound herein described, having the formula $C_{14}H_{12}N_2$, almost insoluble in water, but easily soluble in alcohol and ether, its salts being easily soluble in water and alcohol, and their aqueous solution being precipitated by common salt.

In testimony whereof I have signed my name to this specification in the presence of two subscribing witnesses.

CARL PAAL.

Witnesses:
 EDWARD HEPP,
 FRANZ HASSLAIHER.